Aug. 3, 1943.   G. S. WITHAM, JR   2,326,088
APPARATUS FOR DETERMINING THE TENDENCY OF PAPER TO SHRINK
Filed Dec. 12, 1940   2 Sheets-Sheet 1

INVENTOR
George S. Witham, Jr.
by
ATTORNEY

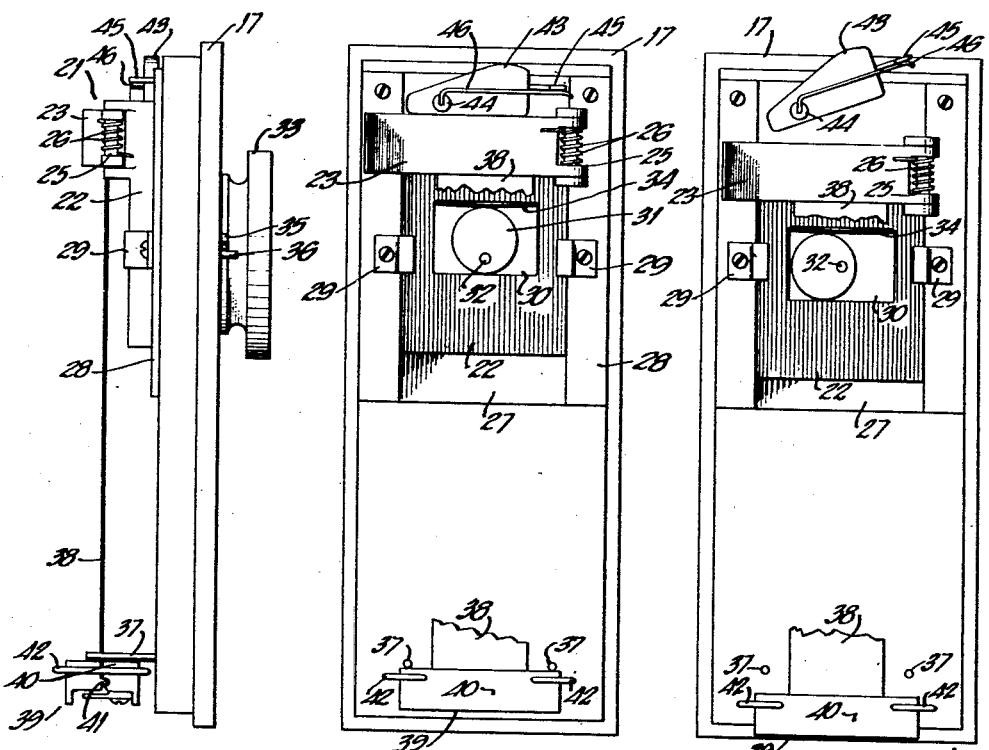
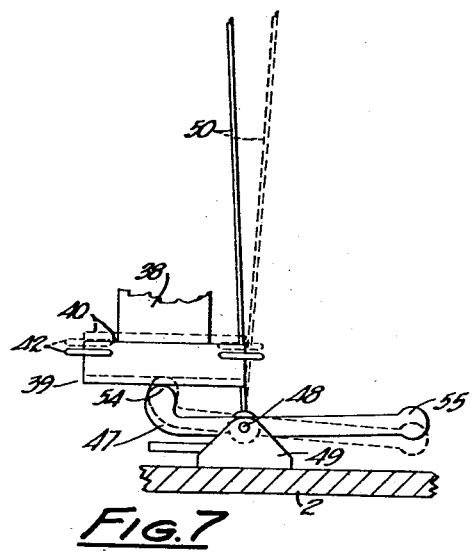
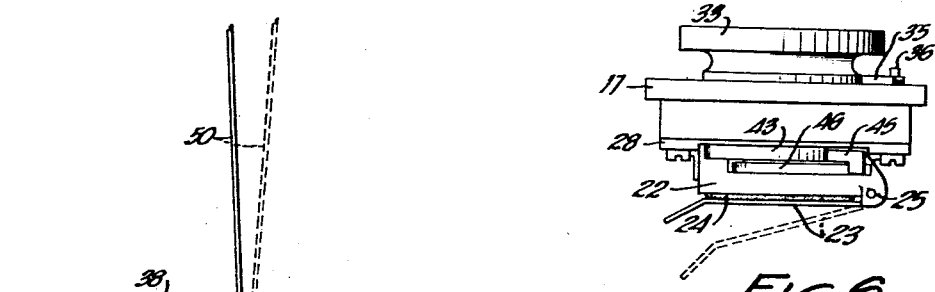
INVENTOR
George S. Witham, Jr.
by
ATTORNEY

Patented Aug. 3, 1943

2,326,088

UNITED STATES PATENT OFFICE 2,326,088

APPARATUS FOR DETERMINING THE TENDENCY OF PAPER TO SHRINK

George S. Witham, Jr., Hudson Falls, N. Y., assignor to W. & L. E. Gurley, Troy, N. Y., a corporation of New York Application December 12, 1940, Serial No. 369,782

8 Claims. (Cl. 73—51)

The tendency of paper to shrink or the degree to which paper will shrink are properties which may be determined and controlled.

Knowledge of the extent of these properties in paper is quite desirable since the suitability of paper for particular purposes is affected thereby. For example, measurements are taken from paper discs, strips and the like on which scales or suitable accurately spaced indications are printed. Such papers or charts are widely used in recording machines or instruments and, obviously, if appreciable shrinkage occurs, the readings obtained therefrom will be in error.

Other uses to which paper may be put and in which the shrinkage properties of the paper is of importance lie in recording machines and automatic machines of many kinds as cash sales recording machines where the paper or papers, if shrinkage occurs, must shrink uniformly so that the duplicates will always be properly centered and spaced. In some instances, paper is perforated to provide a row of holes which acts as a guide and to give feeding mechanism a positive grip on the paper. It is obvious that if shrinkage occurs in papers of this latter character whereby to change or vary the otherwise uniform spacing between the holes, these machines will not operate as desired.

In paper made at different times but, as nearly as possible, of the same character, kind and weight, the tendencies thereof to shrinking are not necessarily the same. However, it is possible to control this tendency in the finished paper by, for example, modifying the stock during the paper making process if during such process the tendency to shrink of the ultimate paper product is determined.

Generally speaking, therefore, it is a first object of my invention to provide an apparatus for determining in paper and like material the tendency thereof to shrink. More specifically, it is an object of my invention to provide an apparatus for determining the tendency to shrink of paper and to provide an apparatus wherein the tendency to shrink of a sample of paper may be determined under standard or substantially constant, predetermined temperature conditions.

Another object resides in providing an apparatus of the foregoing character in which the degree to which the sample paper shrinks, if at all, will be greatly magnified whereby readings of appreciable magnitudes are obtainable. Still more specifically, a further object of my invention resides in providing an apparatus comprising means forming an enclosure within which a specimen sheet or strip of paper or the like may be subjected to heat of substantially constant standard temperature and any shrinking of the paper, under these conditions, magnified for measurement purposes on a scale.

I accomplish the foregoing objects of my invention by the novel constructions and arrangements of elements described below and illustrated in the accompanying drawings, in which—

Fig. 3 is a side elevation view of the gripping means for the sample strip of paper;

Fig. 4 is a front elevation view thereof;

Fig. 5 is a view similar to Fig. 4 but illustrating the parts in different positions;

Fig. 6 is a plan view of the parts shown in Figs. 3 to 5;

Fig. 7 is a fragmentary sectional view of a detail; and

Figures 1, 2, 8:
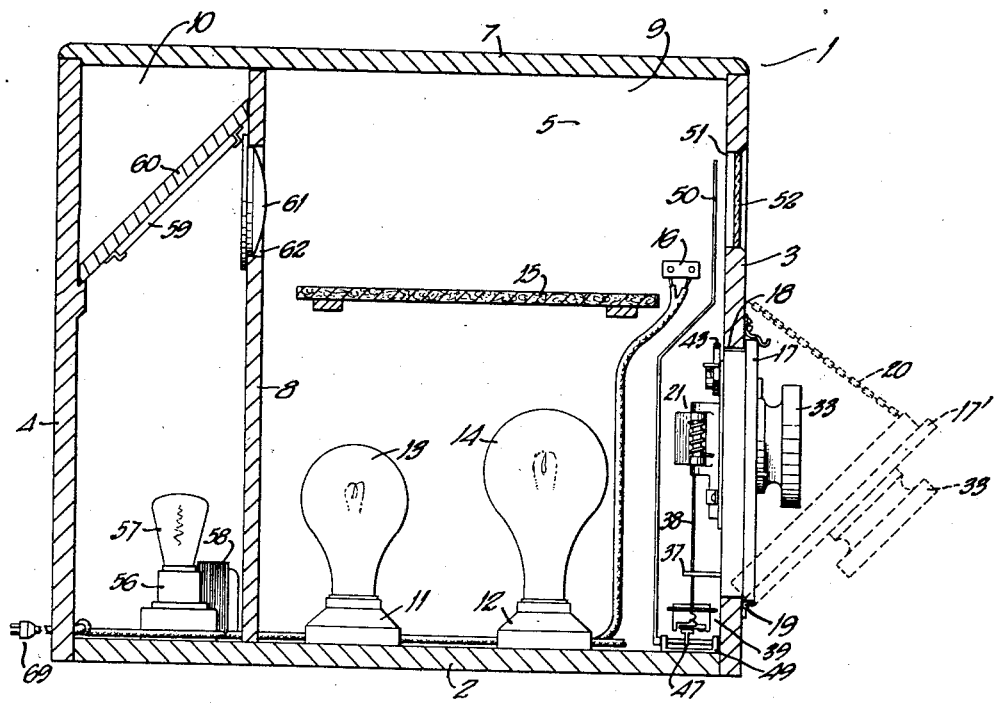
Fig. 1 is a sectional elevation view taken through the apparatus.
Fig. 2 is a front elevation view thereof.
Fig. 8 is a wiring diagram.

Referring to the drawings wherein I have illustrated a preferred embodiment of my invention, a receptacle indicated generally at 1 comprises a base 2, upstanding end walls 3 and 4, side walls 5 and 6, and a cover 7 which may be removable or may be hinged or otherwise suitably secured to the walls of the receptacle.

In carrying out tests with the apparatus herein disclosed, a sample of paper, preferably of a known, desired length, is placed within the receptacle, subjected to heat of substantially a standard or constant, predetermined temperature, and any shrinking of the paper sample determined by registering the magnified extent thereof on a scale. To provide appreciable readings for extremely small degrees of shrinkage of the test strip of paper, I prefer to arrange the various elements of my invention as illustrated in the accompanying drawings, and it will be understood that therein I have illustrated, for exemplary purposes, a preferred embodiment in which accurate readings may be obtained.

The interior of the receptacle is provided with a transversely extending partition 8 which subdivides the receptacle into compartments 9 and 10. The compartment 9 is adapted to be heated to a suitable, standard temperature and means are provided for holding a sample of paper in this compartment for test purposes. The compartment 10, on the other hand, houses a source of light and means are provided for projecting the light in parallel rays across the compartment 9 upon a scale in a manner designed to provide accurate readings, as will hereinafter be more particularly pointed out.

Within the compartment 9 of the receptacle are mounted sockets 11 and 12 for incandescent lamps 13 and 14. These lamps are primarily employed for heating purposes and, of course, other suitable heating means may be employed. Heating coils, for example, may be employed which are adapted to be threaded in the sockets for connection in the electrical circuit of my device.

I prefer to maintain the temperature in the compartment 9 at about 120° F. and, in order so to do, I find that I may employ a lamp of a 40 watt rating and a second lamp of a 100 watt rating. In the embodiment shown, I thermostatically control the lamp of the larger rating. Since it is desirable to maintain a fairly constant temperature within the compartment 9, the walls including the top and base of the receptacle are preferably formed of material having fairly good thermal insulating properties.

In Fig. 1, I have illustrated a baffle 15 which is disposed above the lamps 13 and 14 and is primarily intended for use where my receptacle is designed for other test purposes in addition to the testing of paper samples for their tendency to shrink. A thermostat 16, connected in circuit with the lamp 14 and arranged to control the operation thereof, is disposed within the compartment 9 and, where the baffle plate 15 is employed, at about the elevation thereof above the base of the receptacle.

In the embodiment of my invention illustrated, I have mounted one of the paper-gripping means which serves to hold the sample strip of paper in position for test purposes on a door 17 which is hinged to the front 3 of the receptacle and adapted to form a closure for an opening 18 therein. Furthermore, in the embodiment illustrated, I have so arranged my device that the paper-gripping means may be readily applied to sample strips of paper in such a manner that in each case the portion of the sample strip lying between the gripping means will be of substantially the same length for test purposes; and, furthermore, in the embodiment illustrated, the means for gripping and suspending the sample strips of paper is so correlated with a lock mechanism for the door on which it is mounted that when the sample strip of paper is properly supported in condition for testing purposes within the receptacle, the door will be locked in closed position.

The door 17 is preferably hinged at its lower end, as indicated at 19, to the front wall 3 of the receptacle so that it may be swung outwardly, for example, to the position indicated in dotted lines at 17' for purposes of supplying a sample strip of paper to the gripping means mounted thereon. A chain indicated in dotted lines at 20 may be secured at its opposite ends to the door and receptacle to limit the outward swinging movement of the door. As illustrated more in detail in Figs. 3 to 6, inclusive, a first gripping means from which a sample strip of paper may be suspended is mounted on the inner side of the door 17. This paper-gripping means comprises a block 22 to which is pivotally secured a generally flat plate 23 which is adapted to bear against a strip 24 of suitable material such as rubber, which is preferably affixed to the block 22. The strip 24 is preferably of a character which will substantially prevent any slipping of a paper sample compressed between the plate 23 and strip 24. The plate 23 is pivoted to the block 22 as indicated at 25 and a coil spring 26 is provided normally to urge the plate 23 toward the strip 24 with sufficient force firmly to grip and hold a strip of paper therebetween.

The block 22 is supported for reciprocation in a vertically extending guideway 27 in a plate 28 which is secured to the inner surface of the door 17. Angle pieces 29 are secured to the shoulders disposed on opposite sides of the guideway 27 and the inner ends thereof project inwardly above the block 22 slidably to retain it within the guideway. An opening or recess 30 is provided in the block 22 within which is disposed a cam 31. The cam 31 may comprise a disc, as illustrated, which is eccentrically mounted upon an actuating shaft 32 therefor. The shaft 32 extends through and is journaled in the door 17 and on the end thereof projecting from the outer side of the door is secured an operating handle 33. Preferably, a pair of leaf springs as illustrated at 34 are interposed between the cam and the upper edge of the opening or recess 30.

It should be evident from the foregoing description that when the handle 33 is rotated in one direction or the other, the cam 31 will serve either to raise or lower the block 22 within the guideway 27. The handle 33 is provided with an indicating arm 35 which is adapted to engage a pin 36 fastened to the exterior of the door and limit the movement of the handle in a counterclockwise direction when viewed as shown in Fig. 2. The cam 31 is so arranged on the shaft 32 that, when the arm 35 of the operating handle engages the pin 36, it will occupy the position illustrated in Fig. 4 wherein the block 22 lies in its uppermost position.

Spaced vertically below the paper-gripping means 21, I provide an abutment or a means against which a second paper-gripping means may abut while the sample strip of paper is being positioned in the gripping means 21. In the embodiment illustrated, this means comprises a pair of laterally spaced pins 37 between which a sample strip of paper 38 may pass.

The second paper-gripping means, above referred to and which is indicated generally at 39, is adapted to grip a sample strip of paper in a zone spaced from that engaged by the first paper-gripping means 21 and so constructed that it may be positioned to engage the pins 37 and thereby space the two paper-gripping means apart a predetermined distance, assuming of course that the block 22 is in its uppermost position or in a position determined by the engagement of the arm 35 of the operating handle with the pin 36.

In the form of my invention herein illustrated, the gripping means 39 is freely manipulable and preferably unsecured to any part of the receptacle or its associated parts, this gripping means or clamp comprises a pair of jaws 40 which by means of the cooperable tongue and groove construction indicated at 41 pivotally engage each other and are held together by means of the generally arcuate springs 42 which are secured to the respective jaws and adjacent opposite ends thereof. The springs serve to compress the jaws together on one side of the zone in which they pivotally engage each other but the jaws may be manually spread apart by compressing them on the opposite side of said zone to permit the end of a sample strip of paper to be inserted therebetween. Upon releasing the jaws they will firmly grip the strip therebetween as illustrated in the drawings. It will be understood that the clamp 39 is illustrated mainly for exemplary purposes.

In placing the sample strip of paper within the receptacle for test purposes, the clamp 39 is first applied to one end of the strip. Assuming that the door occupies an open position such as that indicated at 17', the clamp 39 is placed to engage the undersides of the pins 37 and the strip of paper is carried upwardly and passed between the spring compressed plate 23 and the rubber strip on the block 22. Only sufficient tension is placed upon the paper strip to maintain the clamp 39 in engagement with the pins 37 and thereupon plate 24 is allowed to engage and grip the paper strip, holding it firmly against the rubber strip. Assuming that in every case when a sample strip of paper is positioned as above described between the gripping means that the block 22 and the gripping means 21 carried thereby occupy their uppermost positions, every sample strip of paper lying between the gripping means will be of substantially the same length. An arrangement of this character for easily and accurately providing test samples of the same length is very desirable since it affords accurate comparison tests.

After the sample strip of paper is affixed in the gripping means as above described, the operating handle 33 may be turned in a clockwise direction as viewed in Fig. 2 thereby lowering the gripping means 21 and freely suspending the strip of paper with the clamp 39 on the lower end thereof as illustrated in Fig. 5.

In the embodiment of my invention herein illustrated, I have associated a door locking device with the block 22 of the paper-gripping means 21 whereby when the gripping means 21 lies in or substantially in its uppermost position the door may be opened but when it is lowered to an appreciable extent, placing the paper specimen in position for test purposes and with the door in closed position, the door locking mechanism will be positioned to prevent opening of the door. A latch member 43 is pivotally mounted on a stud 44 which is secured to the inside of the door 17. The latch member is provided with an arm 45 which is offset at its outer end to overlie a leaf spring 46 which has one end thereof fastened in the stud 44. The spring 46 tends to produce pivotal movement of the latch member 43 in a counter-clockwise direction as viewed in Figs. 4 and 5. However, as the block 22 moves upwardly toward its uppermost position it will engage the latch member 43 and produce a clockwise rotation thereof thereby moving the uppermost portion of the latch downwardly and to a position wherein it may pass freely through the opening 18 in the wall of the receptacle. When the block 22 is moved downwardly, the spring 46 will move the latch member in a counter-clockwise direction and elevate it, in part, above the top of the opening 18, assuming the door is in closed position, and therefore the latch will prevent opening of the door.

I have provided means for magnifying to a considerable extent the indication of any shrinkage which may occur in a sample strip of paper when it has been placed in freely suspended condition within the receptacle as above described. An arm 47 (see Figs. 1 and 7) is secured intermediate the ends thereof to a shaft 48 which is journaled in a bracket 49. To the shaft 48 is also secured an indicator arm 50 which is of considerable length. The bracket 49 is preferably mounted on or adjacent the base of the receptacle and the arm 50 is arranged to extend in a generally vertical direction with the upper end thereof so arranged as to pass over an opening 51 in the front wall 3 of the receptacle and adjacent the top thereof. Preferably, a target 52 comprising a ground glass window provided with a scale 53 is disposed in the opening 51, the calibrations thereof being preferably arranged on an arc about the shaft 48 as a center. The arm 47 is so positioned that when the door 17 is closed and the paper-gripping means 21 moved downwardly the clamp 39 will engage the end 54 of said arm. The end 55 of arm 47 may be counter-weighted or otherwise arranged normally to pivot the arm in a clockwise direction as viewed in Fig. 7. This will cause the indicator arm 50 to move in a clockwise direction as viewed in Fig. 2. The parts are so arranged, however, that a very small force, for example, the weight of clamp 39, is sufficient to produce counter-clockwise rotation of arms 47 and 50. Hence, when the sample strip of paper is lowered and the clamp on the lower end thereof engages the end 54 of arm 47, this arm together with the indicator arm 50 will move in a counter-clockwise direction. In practice, the sample strip of paper is lowered until the indicator arm 50 or the shadow thereof, as will hereinafter be described, registers with the "zero" calibration of the scale 53. It will, of course, be understood that the weight of the clamp 39 is sufficient at all times to maintain the sample strip taut.

In the compartment 10, I prefer to mount a lamp socket 56 which is adapted to receive an incandescent lamp 57 of a type which will provide substantially a point source of light. Since such incandescent lamps are ordinarily of a six volt rating, a transformer 58 is provided for transformation purposes. A mirror 59, which is mounted on a removable support 60 is provided, in the embodiment illustrated, and arranged to reflect the light rays cast thereupon from the light source 57 through a plano-convex lens 61 which is mounted in an aperture 62 in the partition 8. The lens 61 is a collimating lens which will cast light from the light source in parallel rays across the compartment 9. The light from the light source, therefore, will cast the shadow of the indicator arm 50, when it overlies the opening 51 in the front of the receptacle, upon the ground glass target 52. Parallel light radiation is desirable to insure accuracy in the readings on the scale 53.

An exemplary wiring diagram for my apparatus is illustrated in Fig. 8. Assuming that conductors 63 and 64 are connected with service mains 65 and 66 by means of the plug connector 69 shown in Fig. 1, a circuit will be established through the toggle switch 67, assuming it is closed, to the transformer 58 and lamp 13, and through the thermostat 16 to lamp 14. The transformer 58 and lamp 13 are connected in parallel across the conductors 63 and 64 and lamp 14 and thermostat 16 are connected in series across these conductors. Therefore, when the switch 67 is closed, lamps 57 and 13 will be illuminated and the illumination of lamp 14 will be thermostatically controlled. If desired, both or either of the lamps 13 and 14 may be thermostatically controlled.

The toggle switch 67 may be mounted in the front of the receptacle as shown in Fig. 2. Furthermore, an opening may be provided in one of the side walls of the compartment 9 to provide access to the interior thereof for lamp replacement and other purposes and a door 68, as shown in Fig. 2 is associated therewith.

Testing of sample strips of paper to determine their tendency to shrink may be carried out in the following manner. Assuming that the device is connected to a suitable source of electrical energy, illumination of the target will be provided by the lamp 57 and heating of the compartment 9 and maintenance of the temperature in this compartment at a constant or standard value will be effected through the medium of the lamps 13 and 14 and thermostat 16. When the operating handle on the door 17 is turned as far as possible in a counter-clockwise direction as illustrated in Fig. 2, the upper paper-gripping means 21 will be in proper position to receive a sample strip of paper and the latch 43 will be withdrawn to permit the door to be opened. The gripping means or clamp 39 is applied to one end of a sample strip of paper and so held as to engage the pins 37 on the door 17 while the paper is passed between the plate 23 and rubber strip 24 of the upper gripping means 21. Holding the paper tautly, the plate 24 is allowed to engage and firmly hold the paper against the strip of rubber and, as hereinbefore indicated, that portion of the paper lying between the gripping means will be of a known length which, for example, may be about five inches. Thereafter, any excess paper extending above the upper gripping means 21 may be torn off and the door 17 closed. Thereupon, the operating handle 33 is moved in a clockwise direction as viewed in Fig. 2 until the clamp 39 has moved the indicator arm or its shadow into registration with the "zero" calibration of the scale.

If the sample strip of paper should shrink, clamp 39 will be moved upwardly allowing the arm 47 to rotate in a clockwise direction, for example, as indicated in dotted lines in Fig. 7. Since the effective length of the arm 47 between the shaft 48 and the end 54 thereof is only a fractional part of the length of the indicator arm 50 measured from the shaft 48 to the scale on the target 52, a very small movement of the end 54 of the arm will produce a relatively greater and appreciable movement of the end of the indicator arm 50 which passes over the scale. In other wards, a magnified indication of any shrinkage of the sample strip is provided for reading purposes.

It will be observed that while the sample strip of paper is freely supported within the compartment 9, the door 17 cannot be opened. However, when the test has been completed, it is merely necessary to turn the operating handle as far as possible in a counter-clockwise direction in order to open the door and the paper-gripping means 21 will be properly positioned to receive and measure a new strip of paper.

It will be noted that in the practice of my invention each sample strip of paper which is tested will provide an indication of the shrinkage, if any, which will occur in a predetermined length of said paper under standard temperature conditions. Hence, accurate indications of the tendencies of paper to shrink may be obtained on a standard basis and corrections may be made in the manufacturing process whereby to vary or substantially eliminate the tendency of paper to shrink.

While I have described my invention in its preferred embodiments, it is to be understood that the words which I have used are words of description rather than of limitation. Hence, changes within the purview of the appended claims may be made without departing from the true scope and spirit of my invention in its broader aspects.

What I claim is:

1. In a device of the character described for determining the shrinkage which may occur in paper, a first means for gripping a strip of paper in a zone thereof and for suspending said strip, a second means adapted to be fastened to said strip of paper in a zone thereof spaced from said first mentioned zone and to be supported by said strip, movable means adapted to be operatively associated with said second means for indicating the movement thereof, means for spacing said first and second gripping means a predetermined distance apart while the paper is operatively fastened therebetween, means for separating said last mentioned means and said second means whereby said paper will be freely suspended from said first means and for operatively associating said second means with said indicating means.

2. In a device of the character described for determining the shrinkage which may occur in paper, a first and second, relatively movable means for gripping a strip of paper in spaced zones thereof, means for limiting the movement of the first of said means toward the second while the paper strip is operatively fastened therebetween, means for supporting said movement-limiting means and said first paper-gripping means, when the paper strip is operatively fastened between it and the second paper-gripping means, in relatively movable relation whereby said first paper-gripping means and said movement-limiting means may be freed to permit free relative movement of said paper-gripping means toward each other, and means for indicating relative movement of said paper-gripping means.

3. In a device of the character described for determining the shrinkage which may occur in paper, a first means for gripping a strip of paper in a zone thereof and for suspending said strip, a second means adapted to be fastened to said strip of paper in a zone thereof spaced from said first mentioned zone and to be supported by said strip, means for limiting the upward movement of said second means toward said first means while the paper strip is operatively fastened therebetween, means for supporting said movement-limiting means and said second paper-gripping means, when the paper strip is operatively fastened to it and said first paper-gripping means, in relatively movable relation whereby said second paper-gripping means and said movement-limiting means may be freed to permit free relative movement of said paper-gripping means toward each other, and means for indicating relative movement of said paper-gripping means.

4. In a device of the character described for determining the shrinkage which may occur in paper, a first means for gripping a strip of paper in a zone thereof and for suspending said strip, a second means adapted to be fastened to said strip of paper in a zone thereof spaced from said first mentioned zone and to be supported by said strip, means for limiting the upward movement of said second means toward said first means while the paper strip is operatively fastened therebetween, means for movably supporting said first means to move in a downward direction thereafter to free said second means and permit free movement of said second means relative to said first means, and movable means capable of being operatively associated with said second means for indicating relative movement of said first and second means.

5. In a device of the character described for determining the shrinkage which may occur in paper, a first means for gripping a strip of paper in a zone thereof and for suspending said strip, a second means adapted to be fastened to said strip of paper in a zone thereof spaced from said first mentioned zone and to be supported by said strip, means for limiting the upward movement of said second means toward said first means while the paper strip is operatively fastened therebetween, movable means capable of being operatively associated with said second means for indicating relative movements of said first and second means, and means for movably supporting said first means to move in a downward direction thereafter to free said second means whereby to permit free movement of said second means relative to said first means and operatively to associate said second means with said indicating means.

6. In a device of the character described for determining the shrinkage which may occur in paper, means forming an enclosure provided therein with a first means for gripping a strip of paper in a zone thereof, a second means movable relative to said first gripping means for gripping said strip of paper in a zone thereof spaced from said first mentioned zone, means for spacing said gripping means a known distance apart while the paper strip is operatively fastened therebetween, means for supporting said spacing means and said second paper-gripping means, when the paper strip is operatively fastened between it and said first paper-gripping means, in relatively movable relation whereby said second paper-gripping means and said spacing means may be freed to permit free relative movement of said paper-gripping means relative to each other, a scale, means for indicating such relative movement of said gripping means on said scale, and means for providing a uniform temperature within said enclosure.

7. In a device of the character described for determining the shrinkage which may occur in paper, means forming an enclosure provided therein with a first means for gripping a strip of paper in a zone thereof, a second means movable relative to said first gripping means for gripping said strip of paper in a zone thereof spaced from said first mentioned zone, means for spacing said gripping means a known distance apart while the paper strip is operatively fastened therebetween, means for supporting said spacing means and said second paper-gripping means, when the paper strip is operatively fastened between it and said first paper-gripping means, in relatively movable relation whereby said second paper-gripping means and said spacing means may be freed to permit free relative movement of said paper-gripping means relative to each other, a scale, and means for magnifying relative movement of said gripping means and indicating such magnified movement on said scale.

8. In a device of the character described for determining the shrinkage which may occur in paper, a first and second, relatively movable means for gripping a strip of paper in spaced zones thereof, means for limiting the movement of the first of said means toward the second while the paper strip is operatively fastened therebetween, and means for freeing said first paper-gripping means and said movement-limiting means whereby to permit free relative movement of said paper-gripping means toward each other, and means for indicating relative movement of said paper-gripping means.

GEORGE S. WITHAM, Jr.